US006789397B2

(12) United States Patent　(10) Patent No.: US 6,789,397 B2
Fenton　(45) Date of Patent: Sep. 14, 2004

(54) I.S. MACHINE

(75) Inventor: Frank Alan Fenton, Granby, CT (US)

(73) Assignee: Emhart Glass S.A., Cham (CH)

( * ) Notice: Subject to any disclaimer, the term of this patent is extended or adjusted under 35 U.S.C. 154(b) by 491 days.

(21) Appl. No.: 09/963,740

(22) Filed: Sep. 25, 2001

(65) Prior Publication Data

US 2002/0011082 A1 Jan. 31, 2002

Related U.S. Application Data

(63) Continuation-in-part of application No. 09/460,588, filed on Dec. 14, 1999, now abandoned.

(51) Int. Cl.[7] ............................ C03B 9/44; C03B 11/00
(52) U.S. Cl. .............................. 65/165; 65/159; 65/168
(58) Field of Search ............................ 65/28, 79, 159, 65/165, 168

(56) References Cited

U.S. PATENT DOCUMENTS

| 1,766,979 | A | * | 6/1930 | Canfield ..................... 65/229 |
| 4,343,644 | A | * | 8/1982 | Hullen et al. ................ 65/241 |
| 4,349,368 | A | * | 9/1982 | Hullen et al. ................. 65/28 |
| 4,612,032 | A | * | 9/1986 | Nebelung .................... 65/165 |
| 5,895,513 | A | * | 4/1999 | Ciriello et al. ............... 65/159 |

* cited by examiner

Primary Examiner—Sean Vincent
(74) Attorney, Agent, or Firm—Spencer T. Smith (57) ABSTRACT

An I.S. machine is disclosed wherein the blow molds are held open during a preheat blank mold mode of operation and the neck ring arms of an invert and neck ring assembly are rotated to an acute angle and opened to release held parisons. A cullet chute is defined in the section frame from a location below the invert of the assembly towards the blow molds to collect the parisons which are delivered by a parison deflector.

5 Claims, 8 Drawing Sheets

I.S. MACHINE

The present application is a continuation-in-part of U.S. patent application Ser. No. 09/460,588, filed Dec. 14, 1999, now abandoned.

The present invention relates to I.S. (individual section) machines which transform gobs of molten glass into bottles in a two step process.

BACKGROUND OF THE INVENTION

A state of the art I.S. machine is disclosed in U.S. Pat. No. 5,902,320. Such an I.S. (individual section) machine has a plurality of identical sections (a section frame in which and on which are mounted a number of section mechanisms) each of which has a blank station which receives one or more gobs of molten glass and forms them into parisons having a threaded opening at the bottom (the finish) and a blow station which receives the parisons and forms them into bottles standing upright with the finish at the top.

An invert and neck ring holder mechanism which includes an opposed pair of arms, rotatable about an invert axis, carries the parisons from the blank station to the blow station, inverting the parisons from a finish down to a finish up orientation in the process.

The blank station includes opposed pairs of blankmolds and the blow station includes opposed pairs of blowmolds. The blankmolds and the blowmolds are supported on inserts carried by opposed carriers, each of which may be advanced by a servo motor or the like between open (separated) and closed positions.

During machine start up, the parisons formed in the blank station are not fit for further processing in the blow molds and must be removed from the machine. An operator conventionally must grab the parisons and remove them from the section. This puts the operator face to face with molten glass parisons until the blank side has heated up sufficiently to form parisons which can be formed into bottles at the blow station. This is a very undesirable period of time for the operator.

In the early 80's a prototype variation of an I.S. machine was built which had a rotating blow mold assembly which had two blow mold stations which sequentially received parisons from a single blank mold. This concept is shown in U.S. Pat. No. 4,343,644. The invert mechanism for that machine is disclosed in U.S. Pat. No. 4,612,032. In that machine parisons could be dumped by positioning the invert at a 90° orientation and dropping the parisons into a parison catching device which is lowered into position extending partially over the invert and which discharges the parisons into a cullet chute having an opening defined in the top of the section large enough to accept vertically oriented parisons.

OBJECT OF THE INVENTION

It is an object of the present invention to provide an improved system for removing parisons from an I.S. machine.

BRIEF DESCRIPTION OF THE DRAWINGS

Referring to the drawings:

FIG. 8 is a control diagram illustrating the operation of the invert and neck ring holder mechanism during the preheat blank molds cycle.

BRIEF DESCRIPTION OF THE PREFERRED EMBODIMENT

Figure 1:
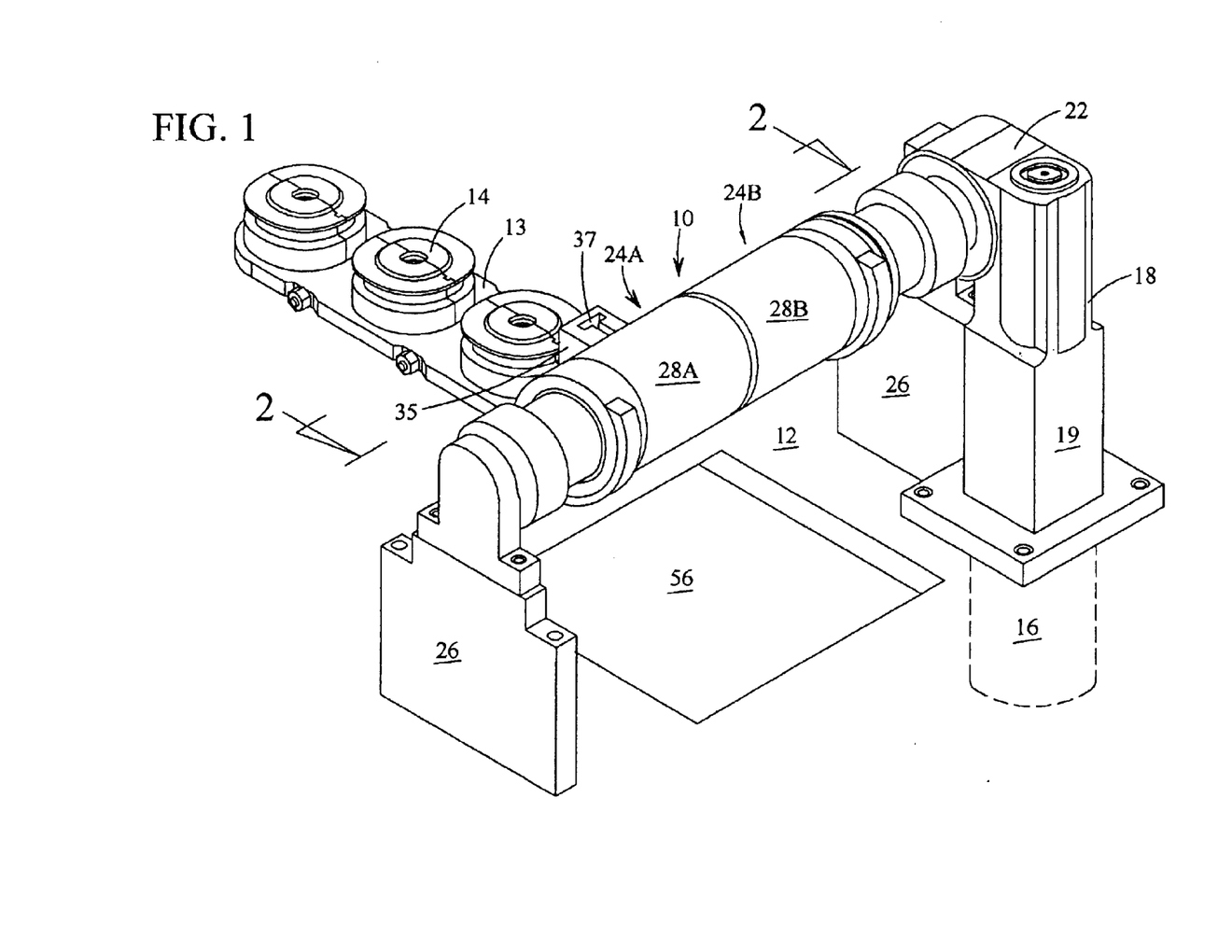
FIG. 1 is an oblique view of an invert and neck ring holder mechanism mounted on the top wall of the section frame of one section of an I.S. machine.

An invert and neck ring holder mechanism 10 (FIG. 1) is mounted on the top surface 12 of a box or frame of a section of an I.S. (individual section) machine which includes one or a plurality (usually 6, 8, 10, or 12) of sections. This mechanism has a pair of opposed neck ring arms 13 which support opposed pairs of neck ring halves 14 which close the bottom of the blankmolds (not shown) when the mold halves are closed. The neck ring halves define the finish (threads) of a parison made in the blank molds which will become the finish of the formed bottles.

Figure 2:
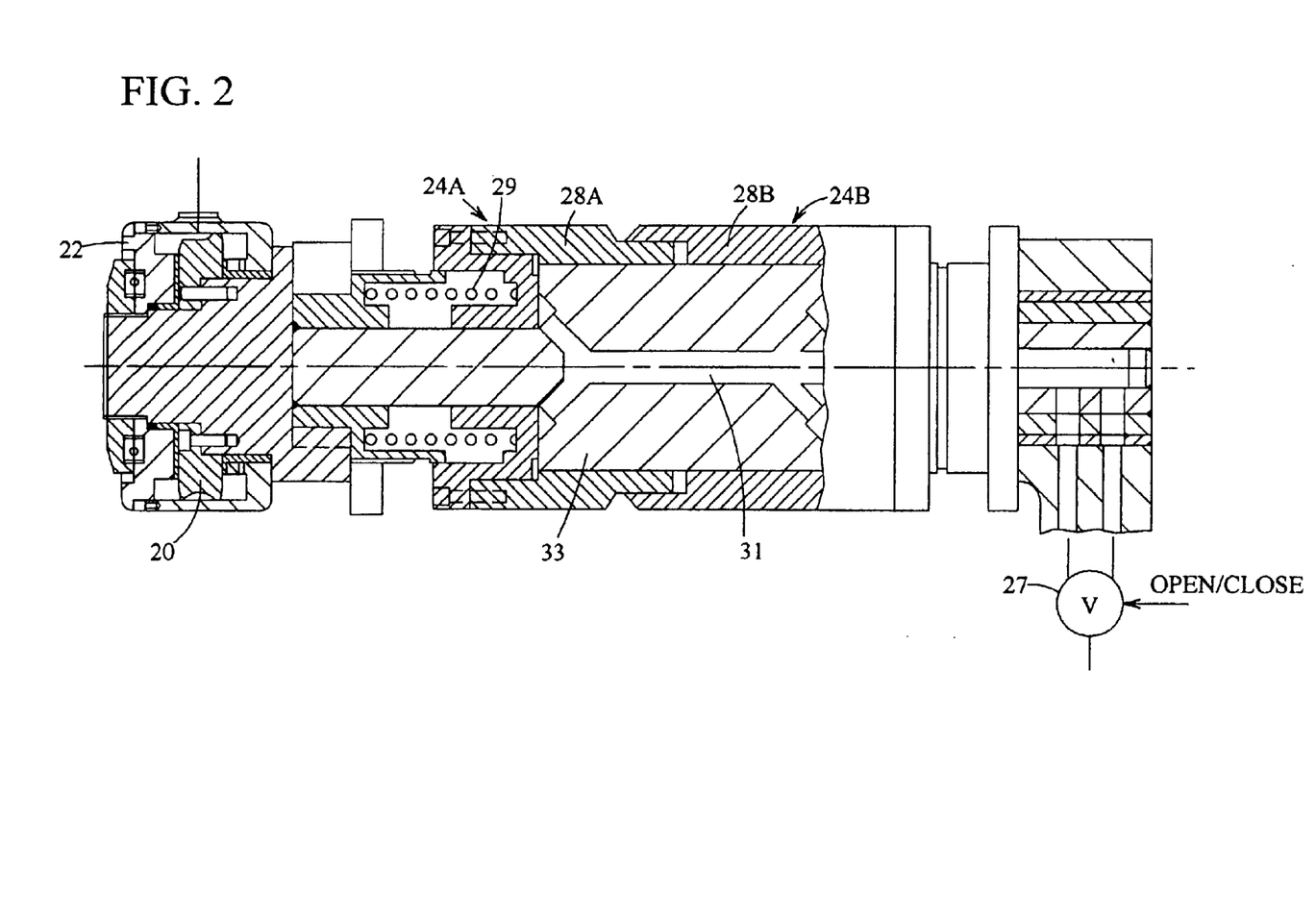
FIG. 2 is a view taken at 2—2 of FIG. 1.

The opposed neck ring holder arms 13 can be displaced from a separated position to the shown closed position by suitable horizontally oriented pneumatic cylinders 24A,24B which are suitably supported between opposed spaced vertical supports or brackets 26. These cylinders each include a cylindrical outer housing 28A,28B and these outer housings are telescopically interconnected and axially displaceable along a cylindrical core 33 (FIG. 2). Each neck ring holder arm has a bracket portion 35 which is removably secured to a corresponding arm support 37 which is part of the corresponding outer housing. The outer housings are spring biased to the closed position (only one spring 29 is shown) and they are pneumatically forced to the open position by compressed air supplied via a suitable valve 27 through the axially extending air conduit 31 in the cylindrical core 33.

When the neck ring holder arms are to be opened an open signal will be received by the valve to open line pressure to the core and when the arms are to be closed the valve will receive a close signal (no open signal). Rotation of the cylindrical core and hence the neck ring arms, is effected by interconnecting the output of a servomotor 16 to the core. In the preferred embodiment this output is a drive shaft in the form of a worm which is located within a worm housing 18 and which is coupled to the output of the motor via a coupling device located in the coupling device housing 19 which converts the rotary output of the motor to linear displacement. The worm rotates a worm gear 20 (FIG. 2) which is supported within a suitable worm gear housing 22. The vertical worm housing 18 and the invert brackets 26 are secured to the top surface 12 of the section frame. In this case the motor (rack) and gear are tangentially related. Alternately, the motor and gear can be coaxial with a suitable coupling therebetween such as shown in the '068 patent. Rotation of the core 33 180° will accordingly rotate the neck ring holder arms 13 180° from the blank station to the blow station.

Figure 3:
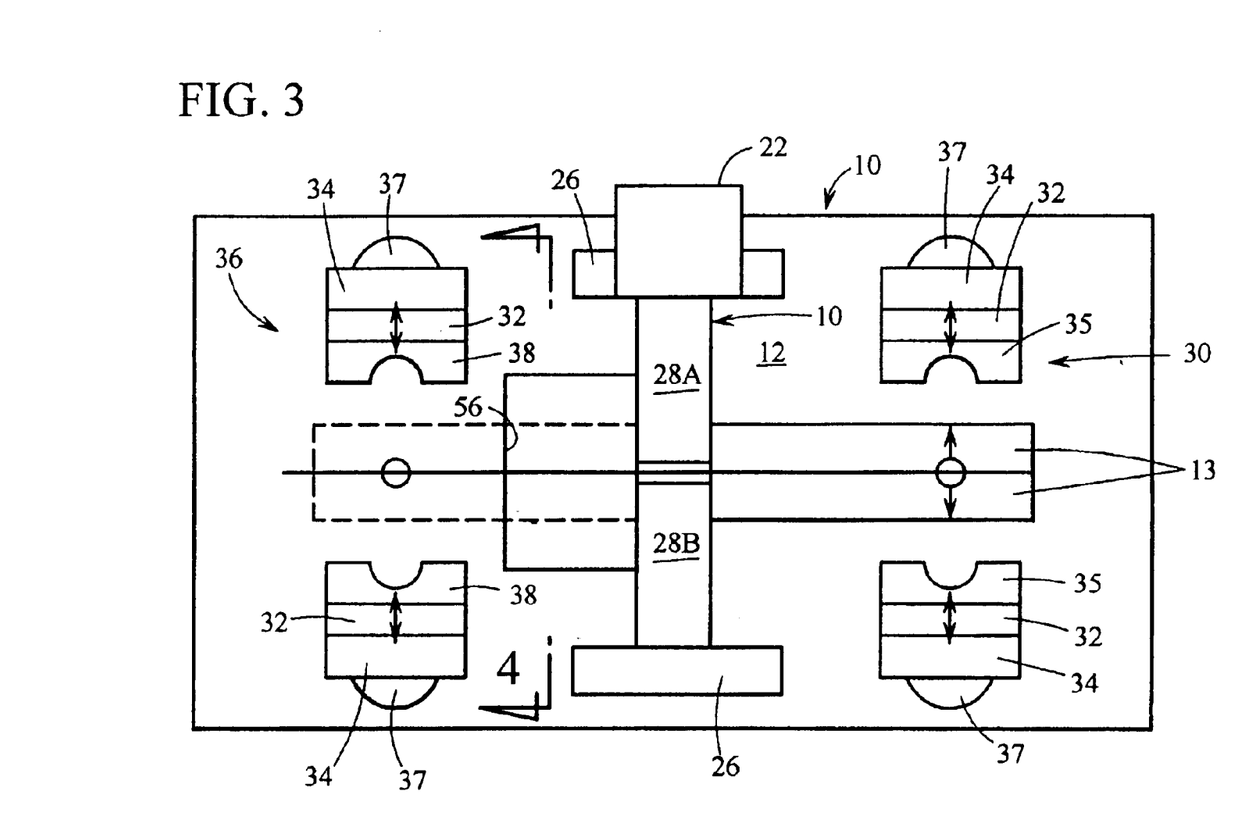
FIG. 3 is a schematic top view of one section of an I.S. machine.

Each section has a blank station 30 (FIG. 3) including a mold opening and closing mechanism defined by an opposed pair of mold support mechanisms 32 which carry blankmold halves 35 and which are displaceable from an open position to a closed position by displacement mechanisms 34 located behind the mold support mechanisms. Each displacement mechanism is driven by a servo motor 37. Each section also has a blow station 36 including a mold opening and closing mechanism defined by an opposed pair of mold support mechanisms 32 which carry blowmold halves 38. The blow station mold support mechanisms are displaceable from an open position to a closed position by the same displacement mechanisms 34 located behind the blow station mold support mechanisms and each of these displacement mechanisms is driven by a servo motor 37. U.S. Pat. No. 5,895,513, discloses a state of the art mold open and close mechanism.

Figure 4:
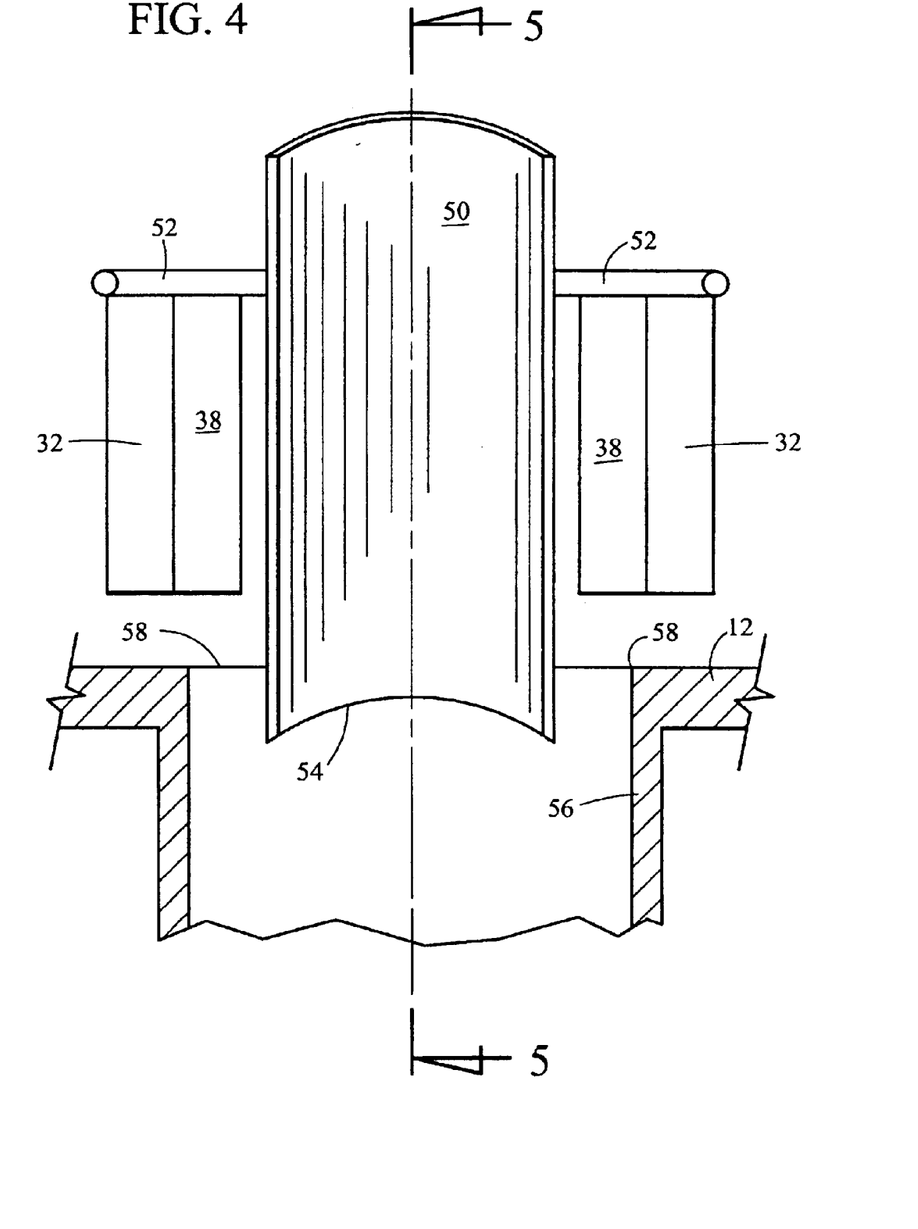
FIG. 4 is an elevational schematic view looking from the invert axis illustrated in FIG. 3, toward the blow molds showing a gob deflector located in position between open blow molds.

FIG. 4 is a view from the invert towards the blow station showing the blow molds fully open and a deflector device including a deflector 50 and a pair of arms 52 secured to the deflector which rest on the top of the opposed mold support mechanisms 32. The deflector is sufficiently long so that it can be situated with the bottom of the deflector 54 extending into a cullet chute 56 defined in the section frame with the opening 58 of the cullet chute being located in the top wall of the section frame. If the rotation of the neck ring holder arms 13, from the blank station to the blow station, is stopped at the blow station with the neck ring holder arms at an angle Θ which locates the held parisons 60 above the deflector 50, and the neck ring holder arms 13 are opened, the parisons will drop onto the deflector and be guided into the cullet chute 56.

An automated parison chute assembly 88 (FIG. 6) includes a parison chute in the form of an elongated trough or channel 90 which has opposed side walls 92. A support shaft 94 is keyed to support pads 96 secured to the top of each side wall at one end of the chute so that rotation of the shaft will effect rotation of the chute. The shaft may be integral with a servo motor 98. The servo motor is secured to a mounting bracket 100 and the mounting bracket is supported by a strut 102 secured to the invert housing 104. The free end of the shaft is rotatably supported by a suitable bearing (not shown) which is supported by a bracket 106 secured to any vertical strut or the like which in the disclosed embodiment is the housing 108 of an invert drive (see U.S. patent application Ser. No. 09/672,551 for details. The free ends of the parison chute side walls are cut out 105 to eliminate interference between the walls and the invert housing when the parison chute is at the down position.

Figure 6:
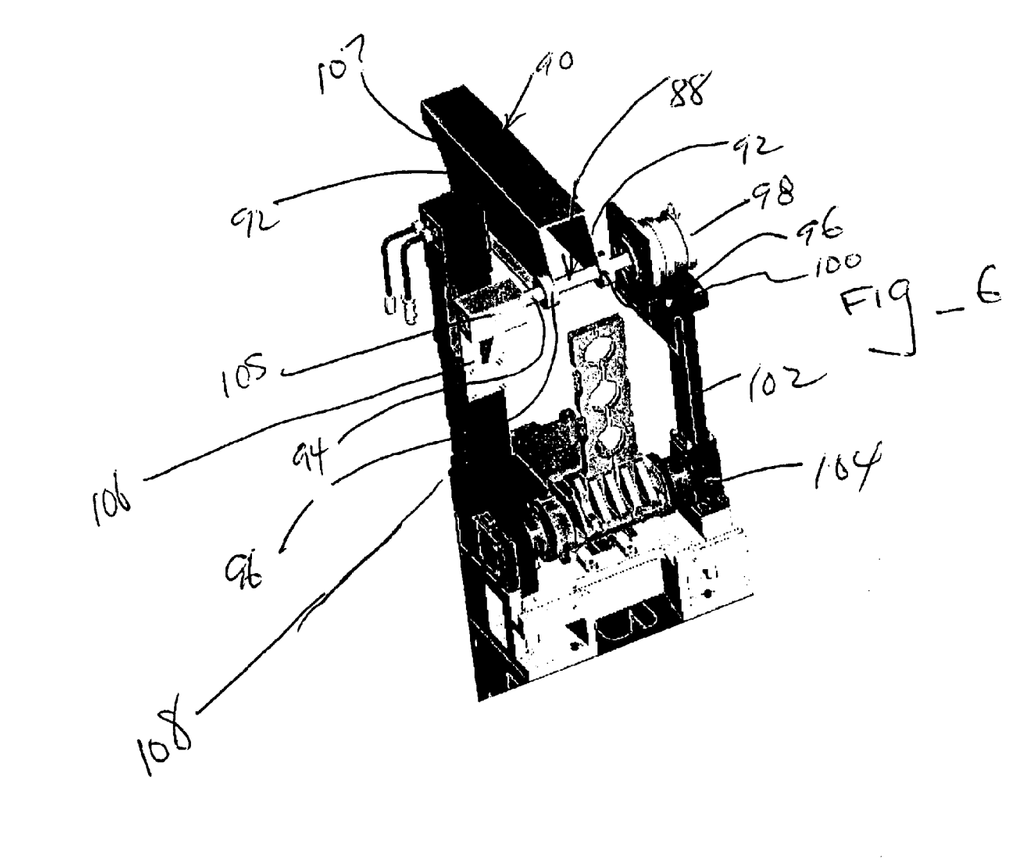
FIG. 6 is an oblique view of a parison chute mechanism made in accordance with the teachings of the present invention with the parison chute at the retracted position.
Figure 7:
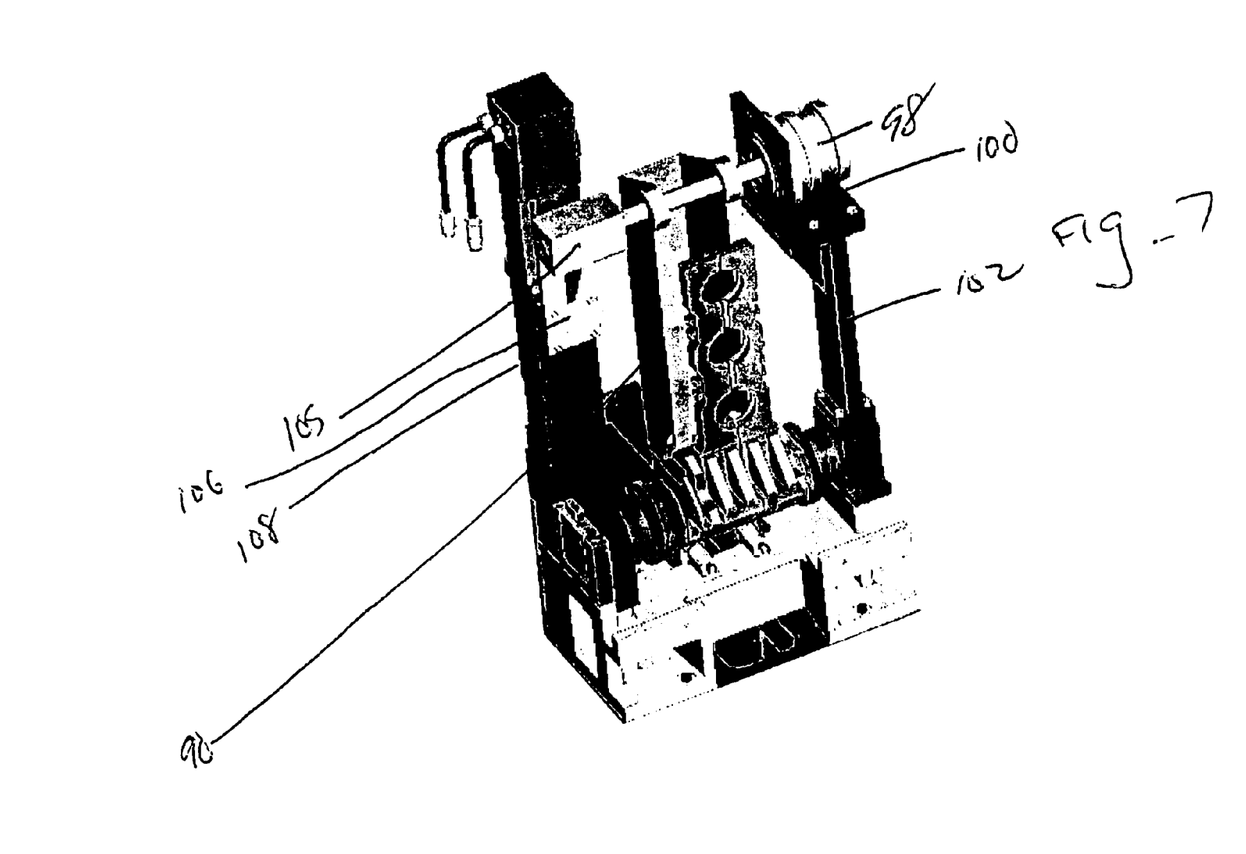
FIG. 7 is a view similar to that of FIG. 6, with the parison chute at the advanced position.

The parison chute can be displaced from a retracted position shown in FIG. 6 approximately 130° to the vertical advanced position shown in FIG. 7. This movement will occur while the blow molds are held in the open position. As shown in FIG. 6 and 7, the neck ring arms can be displaced between the blank station and the blow station when the parison chute is at the retracted position. When parisons are to be removed, the blow molds are held at the open position, the parison chute is displaced to the advanced position and the neck rings which are closed about the finish portion of a formed parison are displaced to a vertical orientation (FIG. 7) and at this orientation or slightly before, the neck ring arms are opened to release the parisons into the parison chute for delivery to the central hole.

Figure 5:
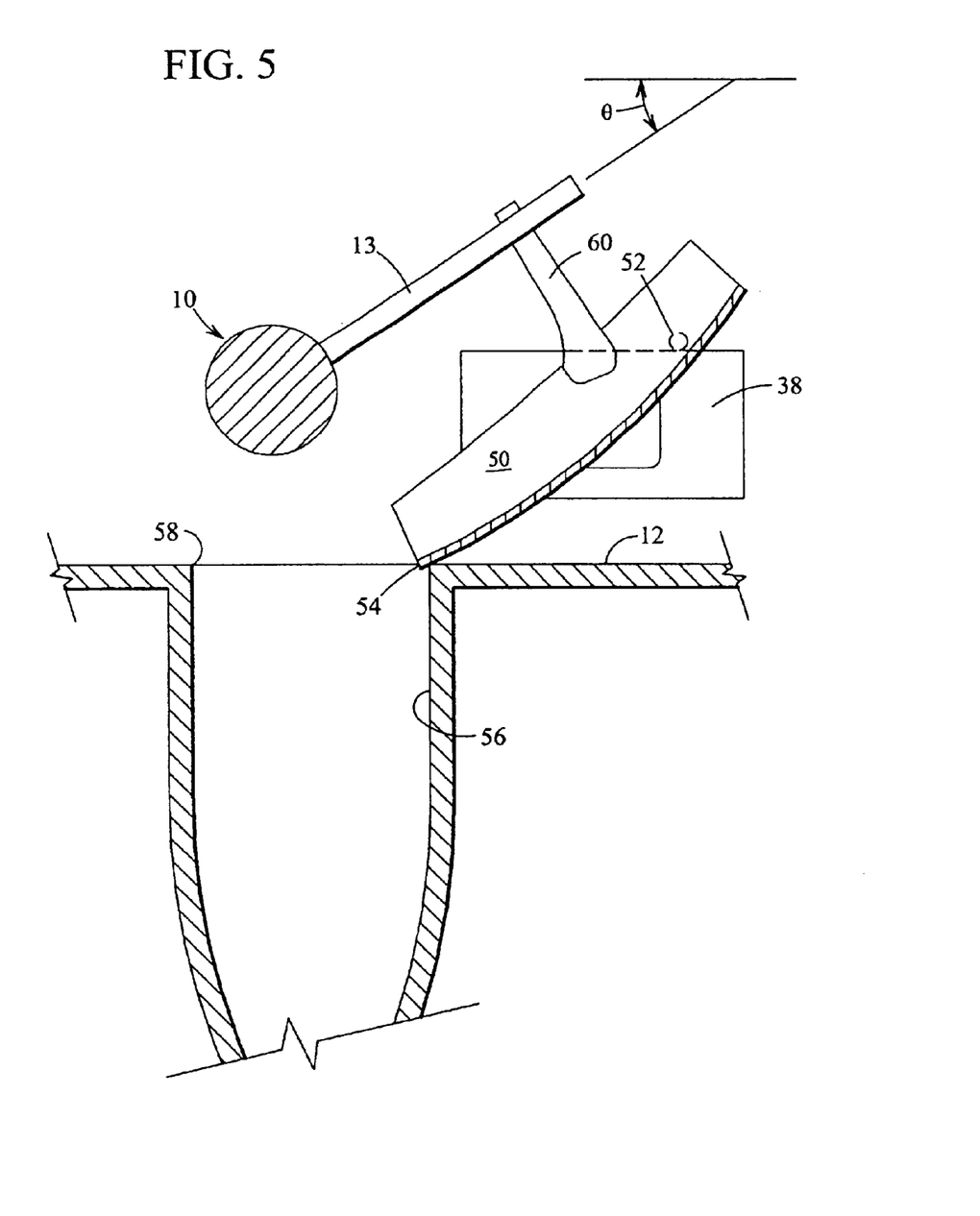
FIG. 5 is a schematic view taken from lines 5—5 of FIG. 4 and additionally showing a formed parison held by the arms of the invert and neck ring holder mechanism shown in FIG. 1, located at a selected angle above the gob deflector shown in FIG. 4.

FIG. 8 illustrates the control algorithm. During section start up, the blank molds will be cold and as a result, the formed parisons can not be properly blown into bottles in the blow molds. The section will be operated by the control 70 in the Preheat Blank Molds Mode 72. During this mode, while the blank station is functioning to periodically form parisons, the control will Maintain Blow Molds At Open Position 73. Are Blow Molds Open 75 will verify that the Blow Molds are open? If there is an automated chute 77, the control will lower chute to down position 79. When it is the Time (in the cycle) To Rotate Neck Ring Arms To Blow Station 74, the control will Rotate Neck Ring Arms To Θ° 78. When the control determines that Neck Ring Arms Are At Θ° 80, the control will Open Neck Ring Arms 82 to release the parisons. Finally when the control determines that the Neck Ring Arms Are Open 84 the control will Close Neck Ring Arms And Return 86 (rotated) back to the blank station for the next cycle. When the automated chute is used, Θ° will be approximately 90°, and when an automated chute is not use, the neck ring arms will rotate further as shown in FIG. 5.

What is claimed is:

1. An I.S. machine including at least one section having a blank station and a blow station comprising a section frame having a top wall, an invert and neck ring mechanism supported on the top wall of said section frame and including
a pair of opposed neck ring holder arms,
a cylinder for supporting said opposed pair of neck ring holder arms for displacement from a closed position to an open position,
a support structure mounted on said section frame for supporting said cylinder for rotation between a first orientation whereat said pair of neck ring holder arms are horizontally located at the blank station to a second orientation whereat said pair of neck ring holder arms are horizontally located at the blow station,
drive means for rotating said cylinder from said first orientation towards said second orientation to a selected orientation establishing a selected angle between said selected orientation and said second orientation, and
displacement means for displacing said neck ring holder arms to the open position, said section frame including a downwardly extending cullet chute having a top opening defined in said top wall, said top opening extending from a location beneath said pivotally mounted cylinder towards said blow station, a mold open and close mechanism supported on said section frame including an opposed pair of blow mold support mechanisms and displacement means including a motor operable to displace said opposed pair of mold support mechanisms between open and closed positions, and control means comprising means for operating in a preheat blank molds mode including
means for maintaining the blow molds at the open position,
means for cyclically operating said drive means to rotate said cylinder to displace sequentially formed parisons to said selected orientation, and
means for operating said displacement means to displace said neck ring holder arms from the closed position to the open position when said cylinder has been rotated to locate a parison at the selected orientation.

2. An I.S. machine according to claim 1, wherein said deflector means comprises a deflector having opposed sides and a pair of arms secured to either side for hanging the deflector on the open opposed pair of blow mold support mechanisms.

3. An I.S. machine according to claim 1, further comprising deflector means for deflecting parisons released from said neck ring holder arms into said cullet chute.

4. An I.S. machine according to claim 3, wherein said deflector means comprises an elongated deflector chute, shaft means secured to one end of said elongated deflector chute, motor means for rotating said shaft means to rotatively displace the elongated deflector chute from a retracted out of the way position to a vertical down position, and support means for supporting said shaft means above said cylinder.

5. An I.S. machine according to claim 4, wherein said shaft means is the output of said motor means.

* * * * *